United States Patent
Zhang et al.

(10) Patent No.: US 7,522,557 B2
(45) Date of Patent: Apr. 21, 2009

(54) TFC AND E-TFC SELECTION FOR A USER EQUIPMENT

(75) Inventors: Guodong Zhang, Farmingdale, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 16 days.

(21) Appl. No.: 11/705,638

(22) Filed: Feb. 12, 2007

(65) Prior Publication Data

US 2007/0140179 A1    Jun. 21, 2007

Related U.S. Application Data

(63) Continuation of application No. 11/019,489, filed on Dec. 22, 2004, now Pat. No. 7,215,655.

(60) Provisional application No. 60/535,426, filed on Jan. 9, 2004.

(51) Int. Cl.
    *H04B 7/216* (2006.01)
(52) U.S. Cl. ................. 370/329; 370/341
(58) Field of Classification Search .......... None
    See application file for complete search history.

(56) References Cited

U.S. PATENT DOCUMENTS

| 7,215,655 B2* | 5/2007 | Zhang et al. ........ 370/320 |
| 2003/0092382 A1 | 5/2003 | Vayanos et al. |
| 2003/0112786 A1* | 6/2003 | Terry et al. ........ 370/342 |
| 2003/0185193 A1 | 10/2003 | Choi et al. |
| 2004/0102205 A1 | 5/2004 | Zhang et al. |
| 2005/0043052 A1 | 2/2005 | Whinnett et al. |
| 2005/0047393 A1 | 3/2005 | Liu |
| 2005/0053088 A1 | 3/2005 | Cheng et al. |
| 2005/0068990 A1 | 3/2005 | Liu |
| 2005/0152310 A1 | 7/2005 | Rudolf et al. |
| 2006/0085729 A1 | 4/2006 | Hashimoto |

FOREIGN PATENT DOCUMENTS

EP    1 560 352    8/2005

OTHER PUBLICATIONS

3GPP2 C.S0002-C, "Physical Layer Standard for cdma2000 Spread Spectrum Systems", 3rd Generation Partnership Project 2 "3GPP2", Version 2.0, Revision C, Jul. 23, 2004.

(Continued)

*Primary Examiner*—Chi H. Pham
*Assistant Examiner*—Soon D. Hyun
(74) *Attorney, Agent, or Firm*—Volpe and Koenig, P.C.

(57) ABSTRACT

A user equipment determines transport format combinations (TFCs) that are available for at a dedicated channel (DCH) based on at least a maximum transmit power for the user equipment. A TFC is selected from the available TFCs for the DCH. Based on a remaining power after the TFC selecting, enhanced uplink TFCs (E-TFCs) are selected that are available for an enhanced dedicated channel (E-DCH). An E-TFC is selected for the E-DCH from the available E-TFCs.

13 Claims, 3 Drawing Sheets

OTHER PUBLICATIONS

3GPP2 C.20003-C, "Medium Access Control (MAC) Standard for cdma2000 Spread Spectrum Systems", 3rd Generation Partnership Project 2 "3GPP2", Version 2.0, Release C, Aug. 2004.
3GPP2 C.S0004-C, "Signaling Link Access Control (LAC) Standard for cdma2000 Spread Spectrum Systems", 3rd Generation Partnership Project 2 "3GPP2", Version 2.0, Revision C, Jul. 23, 2004.
3GPP2 C.S0005-C, "Upper Layer (Layer 3) Signaling Standard for cdma2000 Spread Spectrum Systems", 3rd Generation Partnership Project 2 "3GPP2", Version 2.0, Revision c, Jul. 23, 2004.
3GPP TS25.308, 3rd Generation Partnership Project; Technical Specification Group Radio Access Network; "High Speed Downlink Packet Access (HSDPA)", Version 5.4.0, Stage 2, Release 5, Mar. 2003.
3GPP TS25.309, 3rd Generation Partnership Project; Technical Specification Group Radio Access Network; "FDD Enhanced Uplink", Version 6.0.0, Stage 2, Release 6, Sep. 2004.
3GPP TS25.308, 3rd Generation Partnership Project; Technical Specification Group Radio Access Network; "High Speed Downlink Packet Access (HSDPA)", Version 5.4.0, Stage 2, Release 5, Mar. 2003.
3GPP TS25.308, 3$^{rd}$ Generation Partnership Project; Technical Specification Group Radio Access Network; "High Speed Downlink Packet Access (HSDPA)", Version 5.5.0, Stage 2, Release 5, Mar. 2004.
3GPP TS25.309, 3rd Generation Partnership Project; Technical Specification Group Radio Access Network; "FDD Enhanced Uplink", Version 6.0.0, Stage 2, Release 6, Sep. 2004.
3GPP TS25.309, 3$^{rd}$ Generation Partnership Project; Technical Specification Group Radio Access Network; "FDD Enhanced Uplink"; Version 0.2.0, Stage 2, Release 6, Jun. 2004.
3GPP TSG-RAN WG2, Meeting #38, "E-DCH L2/L3 issues", Oct. 6$^{th}$-10$^{th}$, 2003, Sophia Antipolis, France, pp. 1-2.
3GPP TSG-RAN WG2, Meeting #40, "E-DCH L2/L3 protocol issues", Jan. 12$^{th}$-16$^{th}$, 2004, Sophia Antipolis, France, pp. 1-2.
3GPP, "3$^{rd}$ Generation Partnership Project; Technical Specification Group Radio Access Network; Medium Access Control (MAC) Protocol Specification (Release 1999)," 3GPP TS 25.321 V3.16.0 (Sep. 2003).
3GPP, "3$^{rd}$ Generation Partnership Project; Technical Specification Group Radio Access Network; Medium Access Control (MAC) Protocol Specification (Release 1999)," 3GPP TS 25.321 V3.17.0 (Jun. 2004).
3GPP, "3$^{rd}$ Generation Partnership Project; Technical Specification Group Radio Access Network; Medium Access Control (MAC) Protocol Specification (Release 4), " 3GPP TS 25.321 V4.9.0 (Sep. 2003).
3GPP, "3$^{rd}$ Generation Partnership Project; Technical Specification Group Radio Access Network; Medium Access Control (MAC) Protocol Specification (Release 4)," 3GPP TS 25.321 V4.10.0 (Jun. 2004).
3GPP, "3$^{rd}$ Generation Partnership Project; Technical Specification Group Radio Access Network; Medium Access Control (MAC) Protocol Specification (Release 5)," 3GPP TS 25.321 V5.6.0 (Sep. 2003).
3GPP, "3$^{rd}$ Generation Partnership Project; Technical Specification Group Radio Access Network; Medium Access Control (MAC) Protocol Specification (Release 5)," 3GPP TS 25.321 V5.9.0 (Jun. 2004).
3GPP, "3$^{rd}$ Generation Partnership Project; Technical Specification Group Radio Access Network; Medium Access Control (MAC) Protocol Specification (Release 6)," 3GPP TS 25.321 V6.2.0 (Jun. 2004).
3GPP2 C.20003-C, "Medium Access Control (MAC) Standard for cdma2000 Spread Spectrum Systems", 3$^{rd}$ Generation Partnership Project 2 "3GPP2", Version 2.0, Release C, Aug. 2004.
3GPP2 C.S0002-C, "Physical Layer Standard for cdma2000 Spread Spectrum Systems", 3$^{rd}$ Generation Partnership Project 2 "3GPP2", Version 2.0, Revision C. Jul. 23, 2004.
3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.
3GPP TS25.308, 3rd Generation Partnership Project; Technical Specification Group Radio Access Network; "High Speed Downlink Packet Access (HSDPA)", Version 5.4.0, Stage 2, Release 5, Mar. 3003.
3GPP TS25.308, 3rd Generation Partnership Project; Technical Specification Group Radio Access Network; "High Speed Downlink Packet Access (HSDPA)", Version 5.5.0, Stage 2, Release 5, Mar. 2004.
3GPP TS25.309, 3rd Generation Partnership Project; Technical Specification Group Radio Access Network; "FDD Enhanced Uplink", Version 6.0.0, Stage 2, Release 6, Sep. 2004
3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.
3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.
3GPP TS25.308, 3rd Generation Partnership Project; Technical Specification Group Radio Access Network; "High Speed Downlink Packet Access (HSDPA)", Version 5.4.0, Stage 2, Release 5, Mar. 2003.
3GPP TS25.308, 3$^{rd}$ Generation Partnership Project; Technical Specification Group Radio Access Network; "High Speed Downlink Packet Access (HSDPA)", Version 5.5.0, Stage 2, Release 5, Mar. 2004.
3GPP TS25.309, 3rd Generation Partnership Project; Technical Specification Group Radio Access Network; "FDD Enhanced Uplink", Version 6.0.0, Stage 2, Release 6, Sep. 2004.
3GPP TS25.309, 3$^{rd}$ Generation Partnership Project; Technical Specification Group Radio Access Network; "FDD Enhanced Uplink"; Version 0.2.0, Stage 2, Release 6, Jun. 2004.
3GPP TSG-RAN WG2, Meeting #38, "E-DCH L2/L3 issues", Oct. 6$^{th}$-10$^{th}$, 2003, Sophia Antipolis, France, pp. 1-2.
3GPP TSG-RAN WG2, Meeting #40, "E-DCH L2/L3 protocol issues", Jan. 12$^{th}$-16$^{th}$, 2004, Sophia Antipolis, France, pp. 1-2.
3GPP, "3$^{rd}$ Generation Partnership Project; Technical Specification Group Radio Access Network; Medium Access Control (MAC) Protocol Specification (Release 1999)," 3GPP TS 25.321 V3.16.0 (Sep. 2003).
3GPP, "3$^{rd}$ Generation Partnership Project; Technical Specification Group Radio Access Network; Medium Access Control (MAC) Protocol Specification (Release 1999)," 3GPP TS 25.321 V3.17.0 (Jun. 2004).
3GPP, "3$^{rd}$ Generation Partnership Project; Technical Specification Group Radio Access Network; Medium Access Control (MAC) Protocol Specification (Release 4)," 3GPP TS 25.321 V4.9.0 (Sep. 2003).
3GPP, "3$^{rd}$ Generation Partnership Project; Technical Specification Group Radio Access Network; Medium Access Control (MAC) Protocol Specification (Release 4)," 3GPP TS 25.321 V4.10.0 (Jun. 2004).
3GPP, "3$^{rd}$ Generation Partnership Project; Technical Specification Group Radio Access Network; Medium Access Control (MAC) Protocol Specification (Release 5)," 3GPP TS 25.321 V5.6.0 (Sep. 2003).
3GPP, "3$^{rd}$ Generation Partnership Project; Technical Specification Group Radio Access Network; Medium Access Control (MAC) Protocol Specification (Release 5)," 3GPP TS 25.321 V5.9.0 (Jun. 2004).
3GPP, "3$^{rd}$ Generation Partnership Project; Technical Specification Group Radio Access Network; Medium Access Control (MAC) Protocol Specification (Release 6)," 3GPP TS 25.321 V6.2.0 (Jun. 2004).
3GPP2 C.20003-C, "Medium Access Control (MAC) Standard for cdma2000 Spread Spectrum Systems", 3$^{rd}$ Generation Partnership Project 2 "3GPP2", Version 2.0, Release C, Aug. 2004.
3GPP2 C.S0002-C, "Physical Layer Standard for cdma2000 Spread Spectrum Systems", 3$^{rd}$ Generation Partnership Project 2 "3GPP2", Version 2.0, Revision C, Jul 23, 2004.
3GPP2 C.S0004-C, "Signaling Link Access Control (LAC) Standard for cdma2000 Spread Spectrum Systems", 3$^{rd}$ Generation Partnership Project 2 "3GPP", Version 2.0, Revision C, Jul. 23, 2004.

3GPP2 C.S0005-C, "Upper Layer (Layer 3) Signaling Standard for cdma2000 Spread Spectrum Systems", 3rd Generation Partnership Project 2 "3GPP2", Version 2.0, Revision c, Jul. 23, 2004.

Ericsson, "On the use of short TTI for enhanced uplink DCH," TSG-RAN WG1 #31, R1-030211 (Feb. 18-21, 2003).

Third Generation Partnership Project, "Technical Specification Group Radio Access Network: Feasibility Study for Enhanced Uplink for UTRA FDD (Release 6)," 3GPP TR 25.896 V6.0.0 (Apr. 2004).

Third Generation Partnership Project, "Technical Specification Group Radio Access Network; Feasibility Study for Enhanced Uplink for UTRA FDD (Release 6)," 3GPP TR 25.896 V1.1.2 (Dec. 2003).

* cited by examiner

TFC AND E-TFC SELECTION FOR A USER EQUIPMENT

CROSS REFERENCE TO RELATED APPLICATION

This application is a continuation of U.S. patent application Ser. No. 11/019,489 filed Dec. 22, 2004, which claims priority from U.S. Provisional Application No. 60/535,426 filed Jan. 9, 2004 which are incorporated by reference as if fully set forth.

FIELD OF INVENTION

The present invention is related to a wireless communication system. More particularly, the present invention is related to transport format combination (TFC) selection in wireless transmit/receive units (WTRUs).

BACKGROUND

Under the current Third Generation Partnership Project (3GPP) standards, a WTRU is required to estimate a transmission power for each TFC. In the case that a certain TFC would require more transmission power than the maximum allowed WTRU transmission power, the WTRU should limit the usage of that TFC.

The WTRU continuously evaluates which TFCs can be used for transmission. The evaluation is performed using the estimated WTRU transmit power of a given TFC. When any TFC is restricted for exceeding a transmit power limit, the medium access control (MAC) entity in the WTRU notifies an upper layer to reduce the data rate, if applicable.

Under the current 3GPP standards, a WTRU has only one coded composite transport channel (CCTrCH) in uplink transmission. Therefore, the WTRU transmit power is the transmit power of the CCTrCH, which is determined by the TFC used for the CCTrCH.

In order to improve uplink coverage, throughput and transmission latency for uplink transmissions, enhanced uplink (EU) is currently being investigated in 3GPP. With EU implementation, a WTRU may have more than one CCTrCH in uplink transmissions; one for the regular dedicated channel (DCH) and the other for EU enhanced dedicated channel (E-DCH). In this case, the WTRU transmit power will be the sum of the transmit power of two CCTrCHs.

The WTRU transmit power is determined jointly by the TFCs of the two CCTrCHs. The combination of the TFC used by the dedicated CCTrCH and the TFC used by the EU CCTrCH is defined as the TFC pair of the WTRU whose transmit power is determined jointly by the TFCs of the two CCTrCHs. This is not an optimal method of determining the TFCs for more than one CCTrCH.

There is a need for an efficient method for selecting a combination of TFCs for more than one CCTrCHs in uplink transmission.

SUMMARY

A user equipment determines transport format combinations (TFCs) that are available for at a dedicated channel (DCH) based on at least a maximum transmit power for the user equipment. A TFC is selected from the available TFCs for the DCH. Based on a remaining power after the TFC selecting, enhanced uplink TFCs (E-TFCs) are selected that are available for an enhanced dedicated channel (E-DCH). An E-TFC is selected for the E-DCH from the available E-TFCs.

The WTRU may give priority to a particular CCTrCH, whereby the TFC for that particular CCTrCH is selected first and the TFC for the other CCTrCH is selected within the estimated remaining WTRU transmit power after power required for the selected TFC on the prioritized CCTrCH is deducted from the maximum allowed WTRU transmit power. This method allows for transmission of channels mapped to the first CCTrCH to be prioritized over channels mapped to the other CCTrCH.

Alternatively, the WTRU may reserve a minimum set of TFCs for the other CCTrCH, whereby a TFC for the prioritized CCTrCH is first selected within the maximum allowed WTRU transmit power less the power required to support a minimum set of TFCs on the other CCTrCH. Then the TFC for the other CCTrCH is selected within the remaining WTRU transmit power after power required for the selected TFC on the prioritized CCTrCH is deducted from the maximum allowed WTRU transmit power. This method allows for transmission of channels mapped to the first CCTrCH to be prioritized over channels mapped to the other CCTrCHs while reserving transmit power to allow for a minimum set of TFCs on the other CCTrCH to be transmitted without being effected by the maximum allowed WTRU transmit power limit.

Alternatively, the WTRU may be configured for individual maximum transmit power for each of the plurality of CCTrCHs, whereby a TFC for each CCTrCH is selected within the individual maximum transmit power designated to each CCTrCH. This method allows each CCTrCH to be given a quality of service (QoS) relative to the other CCTrCH. Activity on one CCTrCH does not take priority or reduce the rate of the other CCTrCH.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

Hereinafter, the present invention will be described with reference to a system supporting two CCTrCHs, (i.e., a dedicated CCTrCH and an EU CCTrCH). However, it should be noted that the present invention is applicable to a system supporting more than two CCTrCHs.

Figure 1:
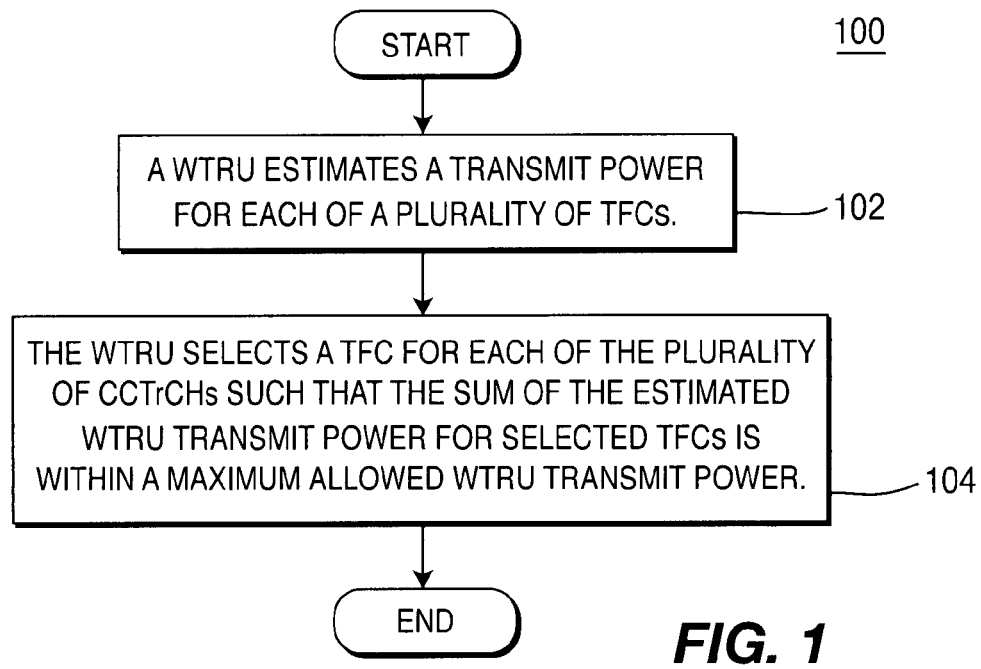
FIG. 1 is a flow diagram of a general process for selecting TFCs in accordance with a first embodiment of the present invention.

FIG. 1 is a flow diagram of a process 100 for selecting TFCs in accordance with a first embodiment of the present invention. The WTRU is configured to process a dedicated CCTrCH and an EU CCTrCH simultaneously in uplink transmission. The transmit power of the WTRU is limited to a maximum allowed WTRU transmit power, which is set by the wireless communication system. In each transmit time interval (TTI), the WTRU estimates the transmit power for each of a plurality of available TFCs (step 102) for each CCTrCH. The WTRU estimates the transmit power of each TFC over a predetermined period taking into account the gain factor of each corresponding TFC. The WTRU then selects TFCs for transmission on each CCTrCH among a plurality of available TFCs, such that the sum of the estimated transmit power of the selected TFCs for the dedicated CCTrCH and the EU CCTrCH does not exceed the maximum allowed WTRU transmit power (step 104).

Additionally, the dedicated CCTrCH, the EU CCTrCH, or both may be provided with a capability of transmitting a reserved minimum set of TFCs even when the power required for transmission of these TFCs exceeds the maximum allowed WTRU transmit power. TFCs that require power greater then the maximum allowed transmit power are defined to be in an excess power state. The minimum set is for reserving a lowest rate in a CCTrCH, thereby maintaining the basic services for the channel. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a guaranteed bit rate (GBR).

The reserved minimum set of TFCs may be transmitted in an excess power state. In order to maintain the transmit power within the allowed maximum level, a WTRU scales down power on physical channels mapped to the dedicated CCTrCH, the EU CCTrCH, or all physical channels present.

Regardless of the TFC selection, the EU CCTrCH may be provided with a minimum reserved set of TFCs that is one or more transport blocks per logical channel or MAC-d flow mapped to the EU CCTrCH. A transport block is one or more radio link control (RLC) protocol data units (PDUs). One or more transport blocks is equivalent to a data rate. The reserved set of TFCs can be transmitted in an excess power state by scaling down power on either the physical channels mapped to the EU CCTrCH, the dedicated CCTrCH or all present UL channels.

Figure 2:
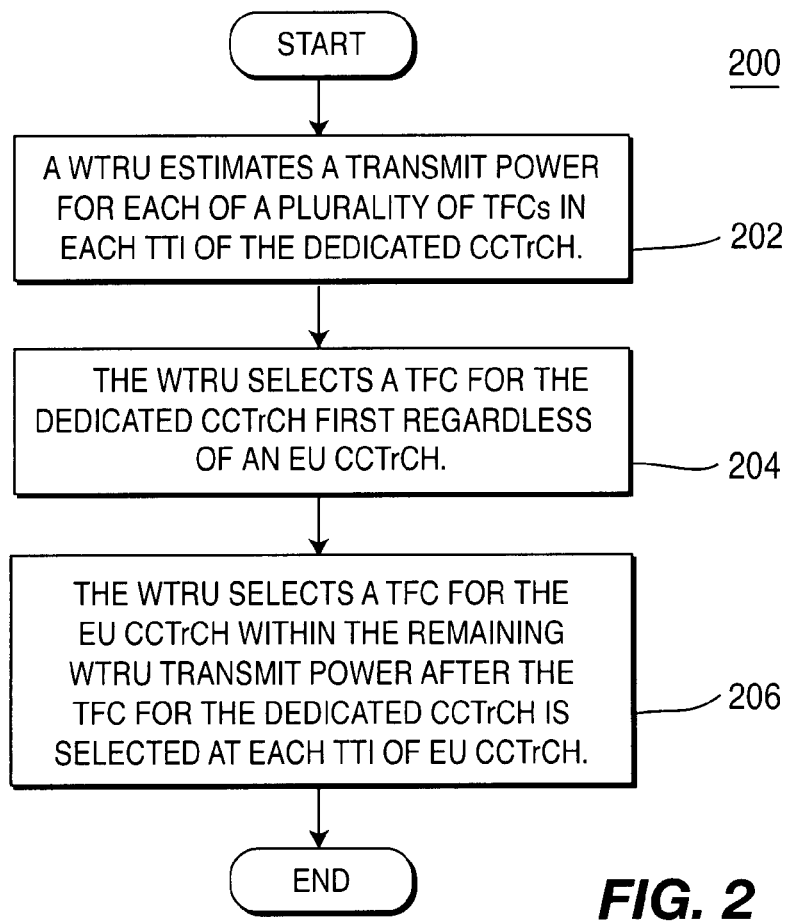
FIG. 2 is a flow diagram of a process for selecting TFCs in accordance with a second embodiment of the present invention.

FIG. 2 is a flow diagram of a process 200 for selecting TFCs in accordance with a second embodiment of the present invention. TFC selection of the dedicated CCTrCH is prioritized over TFC selection of the EU CCTrCH. In each TTI of the dedicated CCTrCH, the WTRU estimates the transmit power requirement for each of a plurality of available TFCs configured for the dedicated CCTrCH (step 202). The WTRU selects a TFC for the dedicated CCTrCH first, without considering the power requirement of the EU CCTrCH (step 204). After the TFC for the dedicated CCTrCH is selected, at each TTI of the EU CCTrCH the WTRU selects a TFC for the EU CCTrCH within the remaining WTRU transmit power after the power required for the selected TFC for the dedicated CCTrCH is deducted from the maximum allowed WTRU transmit power (step 206). The TFC selection of the dedicated CCTrCH is not affected by the operation of EU CCTrCH, while the TFC selection of the EU CCTrCH is affected and limited by the operation of the dedicated CCTrCH.

The remaining power for the EU CCTrCH is estimated either each dedicated CCTrCH TTI or each EU CCTrCH TTI. At each TTI of the EU CCTrCH, the remaining power available for the EU CCTrCH is estimated as the maximum allowed WTRU transmit power minus the power required by transmission of the selected dedicated CCTrCH TFC. Alternatively, at each TTI of the dedicated CCTrCH, the remaining power available for the EU CCTrCH is estimated as the maximum allowed WTRU transmit power minus the power required to support transmission of the selected dedicated CCTrCH TFC.

In process 200, the EU CCTrCH may allow transmission of a minimum set of TFCs even when these TFCs are in excess power state. An EU TFC is in excess power state when the estimated remaining power is less then the calculated transmission power requirement for the EU CCTrCH TFC. The EU minimum set reserves a lowest or guaranteed rate on channels mapped to the EU CCTrCH, and thereby maintains the basic services for EU channels. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a guaranteed bit rate (GBR). When transmitting a TFC in excess power state, in order to maintain the transmit power within the allowed maximum level, the WTRU scales down power on physical channels mapped to the EU CCTrCH, the dedicated CCTrCH, or all physical channels present.

Figure 3:
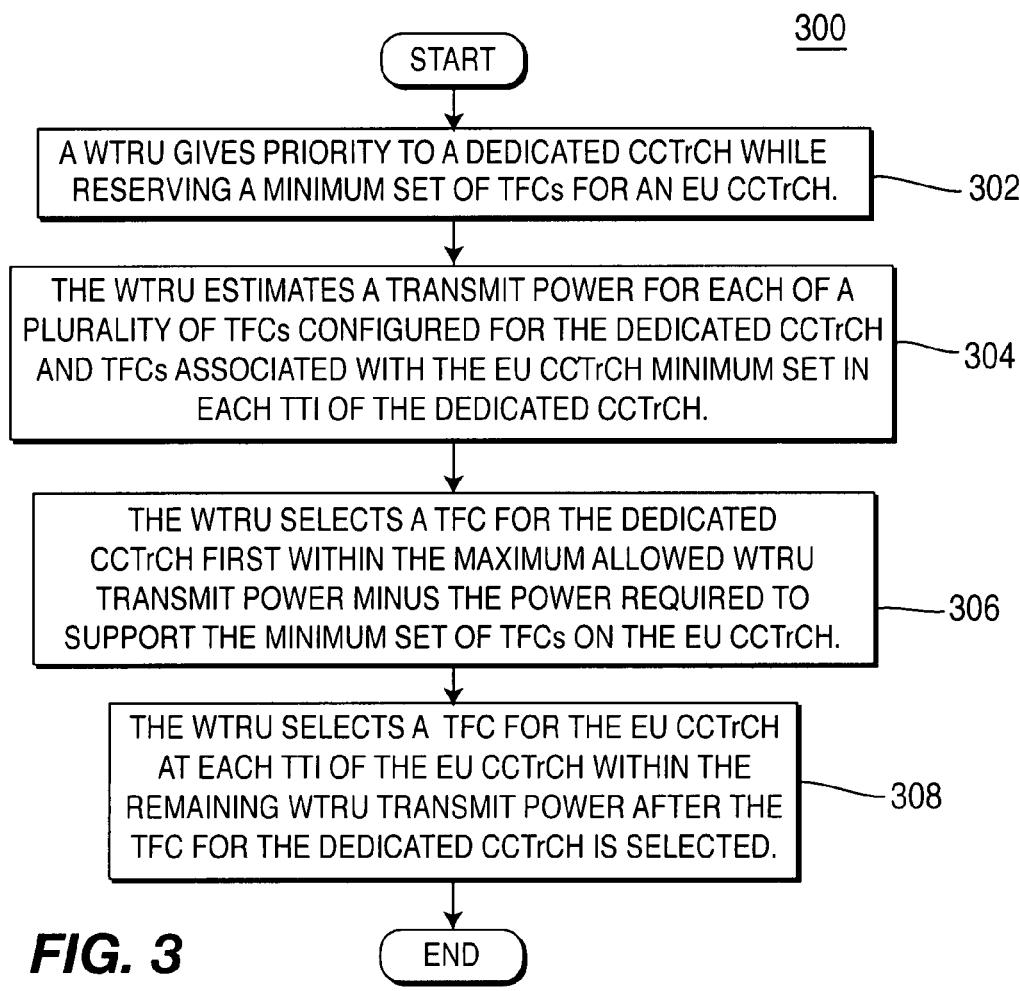
FIG. 3 is a flow diagram of a process for selecting TFCs in accordance with a third embodiment of the present invention.

FIG. 3 is a flow diagram of a process 300 for selecting TFCs in accordance with a fourth embodiment of the present invention. The WTRU gives priority to dedicated CCTrCH TFC selection while reserving transmit power for a minimum set of EU CCTrCH TFCs (step 302). A minimum set of TFCs for an EU CCTrCH is defined to reserve a lowest or guaranteed rate for channels mapped to the EU CCTrCH. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH, or a number of transport blocks per TTI corresponding to a GBR.

The EU CCTrCH may allow transmission of a minimum set of TFCs even when these TFCs are in excess power state. An EU TFC is in excess power state when the estimated remaining power is less then the calculated transmission power requirement for the EU TFC. When transmitting a TFC in excess power state, in order to maintain the transmit power within the allowed maximum level, the WTRU scales down power on physical channels mapped to the EU CCTrCH, the dedicated CCTrCH, or all physical channels present.

When a TFC is in an excess power state (with reduced power), the quality of the transmission is reduced, (i.e., lower SIR, higher BLER, etc). This may defeat the purpose of maintaining the minimum set. Therefore, in order to minimize the possibility that the EU CCTrCH TFC has to be transmitted in an excess power state, and to further insure the minimum set is really supported, in process 300 transmit power is reserved for the EU minimum set when TFC selection is performed on the prioritized dedicated CCTrCH.

TFC selection of the dedicated CCTrCH is prioritized over TFC selection of the EU CCTrCH. In each TTI of the dedicated CCTrCH, the WTRU estimates the transmit power for each of a plurality of available TFCs configured for the dedicated CCTrCH and TFCs associated with the EU CCTrCH minimum set (step 304). The WTRU selects a TFC for the dedicated CCTrCH that has a power requirement that does not exceed the maximum allowed transmit power minus the power required to support the minimum set of TFCs on the EU CCTrCH (step 306). After the TFC for the dedicated CCTrCH is selected, at each TTI of the EU CCTrCH the WTRU selects a TFC for the EU CCTrCH with the remaining transmit power after power required for the selected the TFC for the dedicated CCTrCH is deducted from the maximum allowed transmit power (step 308).

The remaining power for the EU CCTrCH is estimated either each dedicated CCTrCH TTI or each EU CCTrCH TTI. At each TTI of the EU CCTrCH, the remaining power available for the EU CCTrCH is estimated as the maximum allowed WTRU transmit power minus the power required by transmission of the selected dedicated CCTrCH TFC. Alternatively, at each TTI of the dedicated CCTrCH, the remaining power available for the EU CCTrCH is estimated as the maximum allowed WTRU transmit power minus the power required to support transmission of the selected dedicated CCTrCH TFC.

Since the dedicated CCTrCH TFC selection takes precedence over the EU CCTrCH, and the power requirement may change during the dedicated TTI, the minimum set of TFCs of the EU CCTrCH may still be transmitted in an excess power state even though power was reserved when the dedicated TFC was selected. In this situation, in order to maintain the transmit power within the allowed maximum level, the WTRU scales down all physical channels mapped to the EU CCTrCH, the dedicated CCTrCH, or all physical channels present.

Figure 4:
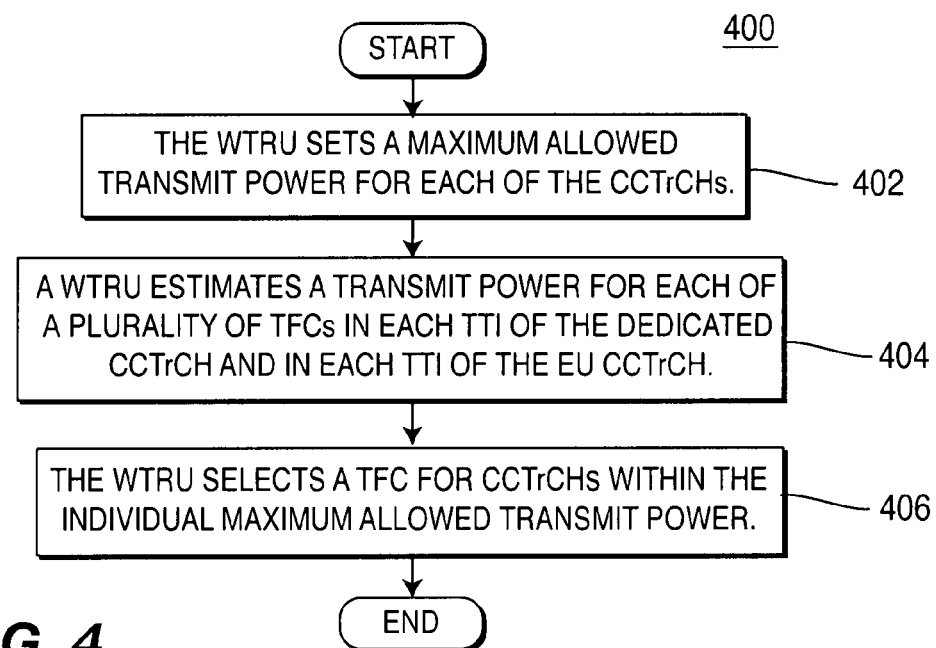
FIG. 4 is a flow diagram of a process for selecting TFCs in accordance with a fourth embodiment of the present invention.

FIG. 4 is a flow diagram of a process 400 for selecting TFCs in accordance with a third embodiment of the present invention. The WTRU sets an individual maximum transmit power, or a ratio relative to the maximum allowed WTRU transmit power, for a dedicated CCTrCH and an EU CCTrCH (step 402). The maximum power level (or the ratio) for each CCTrCH is a configurable parameter. The factors for determining the maximum power level (or the ratio) for each CCTrCH may include, but are not limited to, a data rate of each CCTrCH, quality-of-service (QoS) of each CCTrCH and a relative priority between the CCTrCHs.

In each TTI of the dedicated CCTrCH and in each TTI of the EU CCTrCH, the WTRU estimates the transmit power for each of a plurality of available TFCs (step 404). The WTRU then selects a TFC for each CCTrCH within the individual maximum transmit power of each CCTrCH (step 406). The TFC selection process for each CCTrCH operates independently. The TFC of each CCTrCH is selected from only those TFCs that can be supported by the individual maximum power level determined for a particular CCTrCH.

The dedicated CCTrCH, the EU CCTrCH, or both may be provided with a capability of transmitting a minimum set of TFCs. The minimum set is for reserving a lowest rate for each channel mapped to the CCTrCH, thereby maintaining the basic services for each channel. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a GBR.

The minimum set of TFCs may be transmitted in an excess power state. In this situation, in order to maintain the transmit power within the allowed maximum level, the WTRU scales down all physical channels mapped to the EU CCTrCH, the dedicated CCTrCH, or all physical channels present.

Figure 5:
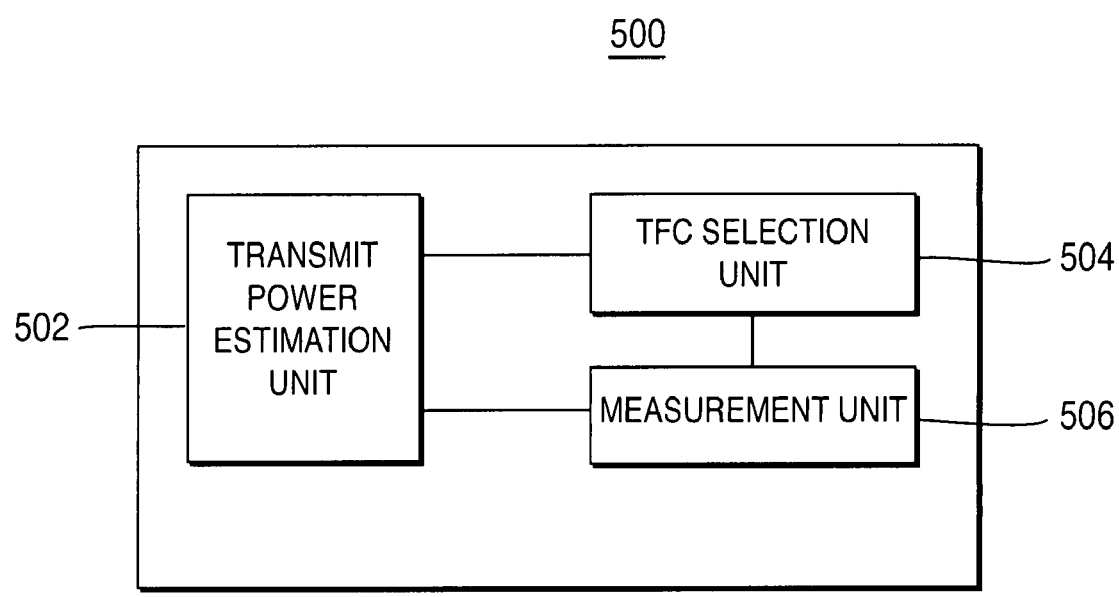
FIG. 5 is a block diagram of an apparatus for selecting TFCs in accordance with the present invention.

FIG. 5 is a block diagram of an apparatus 500 for selecting TFCs in accordance with the present invention. The apparatus comprises a transmit power estimation unit 502, a TFC selection unit 504, and a measurement unit 506. The transmit power estimation unit 502 calculates an estimate of a transmit power for each of a plurality of available TFCs. The TFC selection unit 504 selects a TFC for each CCTrCH such that the sum of the estimated WTRU transmit power for the selected TFCs is within a maximum WTRU transmit power. The measurement unit 506 performs physical measurements of the WTRU transmit power over a predetermined period, and the transmit power estimation unit 502 calculates the estimate of a transmit power of each TFC using the measurement results and a gain factor of the corresponding TFC.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use by a user equipment, comprising:
   determining transport format combinations (TFCs) that are available for a dedicated channel (DCH) based on at least a maximum transmit power for the user equipment;
   selecting a TFC from the available TFCs for the DCH;
   based on a remaining power after the TFC selecting, determining enhanced uplink TFCs (E-TFCs) that are available for an enhanced dedicated channel (E-DCH);
   selecting an E-TFC for the E-DCH from the available E-TFCs; and
   transmitting the DCH as formatted per the selected TFC and the E-DCH as formatted per the selected E-TFC.

2. The method of claim 1 wherein the selecting the TFC and the E-TFC occurs on a transmit time interval (TTI) basis.

3. The method of claim 1, further comprising:
   providing a minimum set of E-TFCs which can be selected for the E-DCH when the required power of an E-TFC of the minimum set would result in the user equipment exceeding the maximum transmit power.

4. The method of claim 3 wherein a transmission power level of the transmitted E-DCH is scaled when the maximum transmit power would be exceeded without the E-DCH transmit power being scaled.

5. A user equipment comprising:
   a transport format combination (TFC) selection unit to determine transport format combinations (TFCs) that are available for a dedicated channel (DCH) based on at least a maximum transmit power for the user equipment, wherein the TFC selection unit selects a TFC from the available TFCs for transmission of the DCH, the TFC selection unit determines enhanced uplink TFCs (E-TFCs) that are available for an enhanced dedicated channel (E-DCH) based on a remaining power after the TFC is selected, and selects an E-TFC for transmission of the E-DCH from the available E-TFCs.

6. The user equipment of claim 5 wherein the user equipment transmits the DCH as formatted per the selected TFC and the E-DCH as formatted per the selected E-TFC.

7. The user equipment of claim 5 wherein the TFC selection unit selects the TFC and the E-TFC on a transmit time interval (TTI) basis.

8. The user equipment of claim 5 wherein the TFC selection unit selects a minimum set of E-TFCs for the E-DCH when the required power of an E-TFC of the minimum set exceeds the maximum transmit power.

9. The user equipment of claim 8 wherein the user equipment scales a transmission power level of the transmitted E-DCH when the maximum transmit power would be exceeded without the E-DCH transmit power being scaled.

10. The user equipment of claim 5 comprising a transmit power estimation unit to calculate a transmission power level associated with TFCs and E-TFCs.

11. The user equipment of claim 10 comprising a measurement unit to take physical measurements.

12. The user equipment of claim 11 wherein the transmit power estimation unit uses the physical measurements and a gain factor associated with TFCs and E-TFCs to calculate a transmission power level associated with the TFCs and E-TFCs.

13. The user equipment of claim 5 wherein the TFC selection unit is on an integrated circuit.

* * * * *

UNITED STATES PATENT AND TRADEMARK OFFICE
CERTIFICATE OF CORRECTION

PATENT NO. : 7,522,557 B2 Page 1 of 1
APPLICATION NO. : 11/705638
DATED : April 21, 2009
INVENTOR(S) : Zhang et al.

It is certified that error appears in the above-identified patent and that said Letters Patent is hereby corrected as shown below:

IN THE SPECIFICATION

At column 1, line 55, after the words "than one" delete "CCTrCHs" and insert therefor --CCTrCH--.

At column 2, line 23, before the words "by the" delete "effected" and insert therefor --affected--.

At column 3, line 20, after the word "greater" delete "then" and insert therefor --than--.

At column 4, line 10, after the words "is less" delete "then" and insert therefor --than--.

At column 4, line 41, after the words "is less" delete "then" and insert therefor --than--.

At column 5, line 1, after the word "selected" delete "the".

Signed and Sealed this

Thirtieth Day of June, 2009

JOHN DOLL
*Acting Director of the United States Patent and Trademark Office*